Oct. 28, 1969  J. U. BERKL  3,475,592
HEATER FOR CONTRACTING SHRINKABLE TUBING
Filed May 11, 1967  2 Sheets-Sheet 1
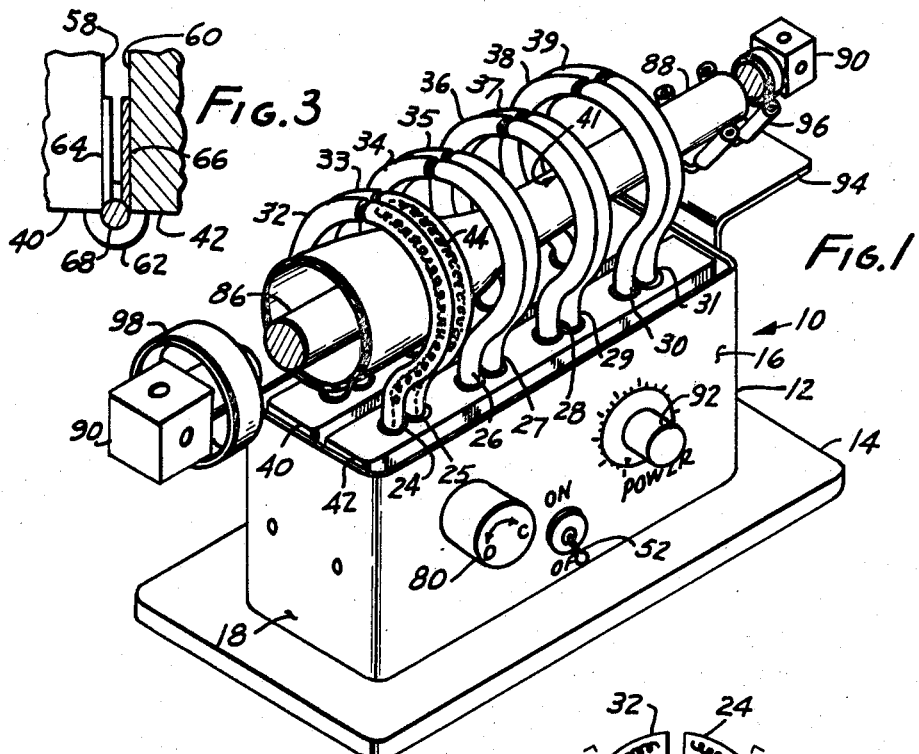
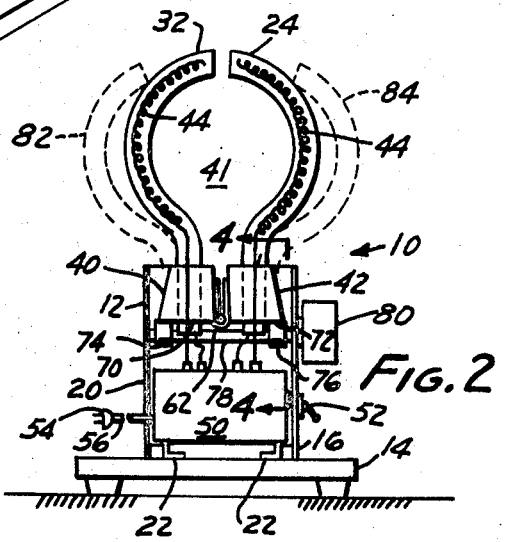
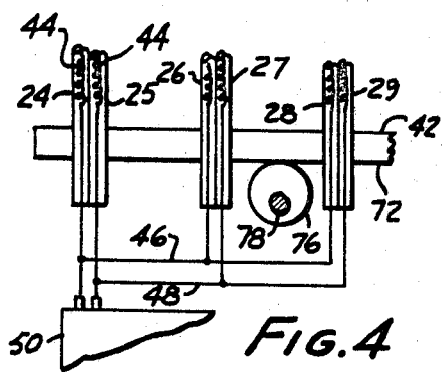
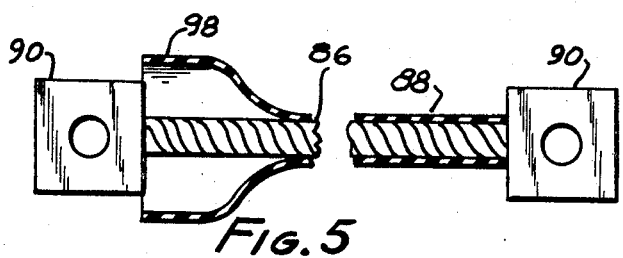
INVENTOR.
JOSEF U. BERKL
BY Angus & Mon
ATTORNEYS.

Oct. 28, 1969   J. U. BERKL   3,475,592
HEATER FOR CONTRACTING SHRINKABLE TUBING
Filed May 11, 1967   2 Sheets-Sheet 2
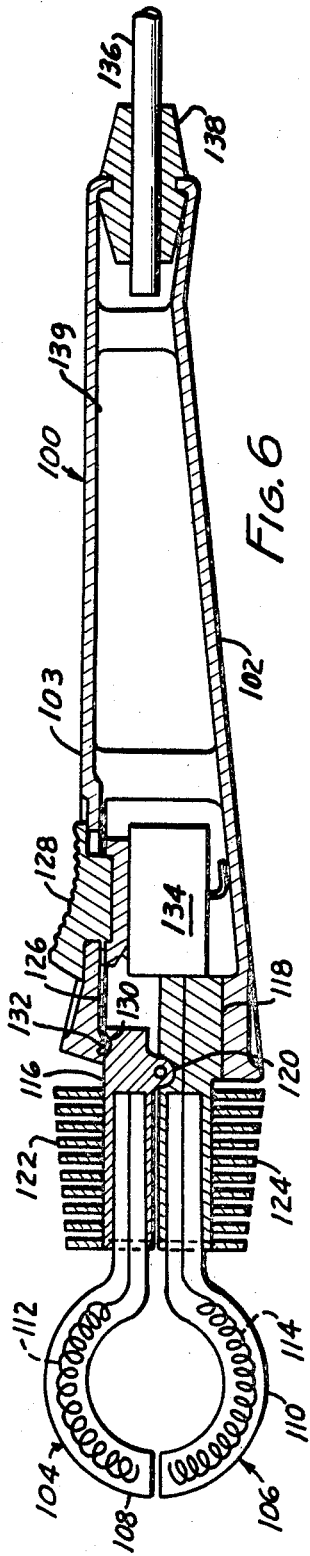
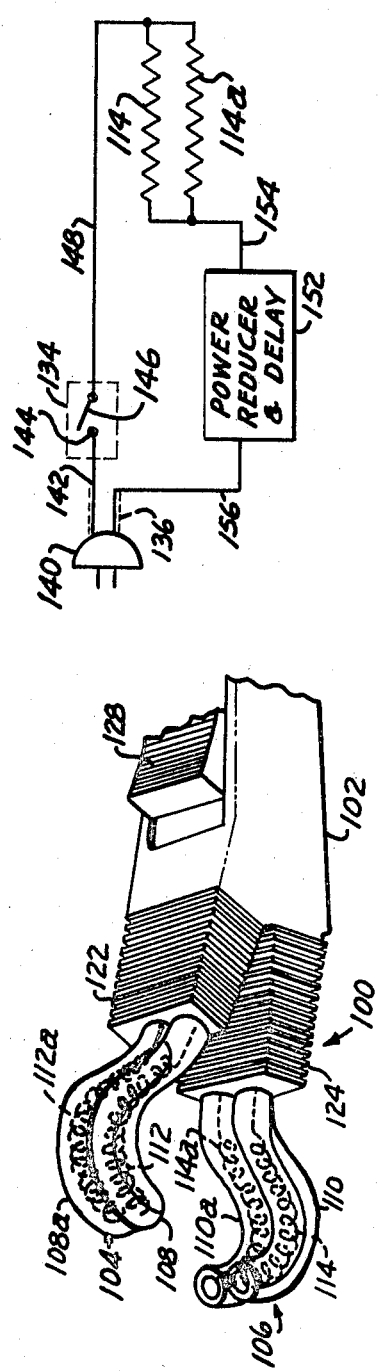
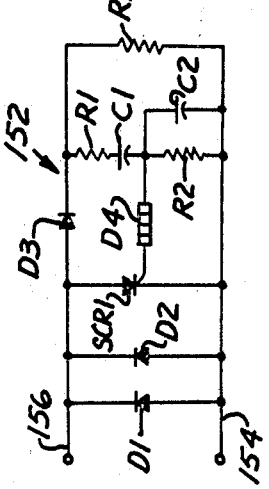
INVENTOR.
JOSEF U. BERKL
BY
ATTORNEYS.

United States Patent Office 3,475,592
Patented Oct. 28, 1969

3,475,592
HEATER FOR CONTRACTING SHRINKABLE TUBING
Josef U. Berkl, Redondo Beach, Calif., assignor to Hi-Shear Corporation, Torrance, Calif., a corporation of California
Continuation-in-part of application Ser. No. 600,441, Dec. 9, 1966. This application May 11, 1967, Ser. No. 649,763
Int. Cl. F27b 9/06; F27d 9/00
U.S. Cl. 219—388                          11 Claims

ABSTRACT OF THE DISCLOSURE

This invention relates to a heater assembly for contracting shrinkable tubing over an elongated object whereby an elongated object of indefinite length, such as an electrical cable, may be sheathed with shrinkable tubing, even when the cable carries large end terminals or elbows. The heater assembly comprises first and second radiant heater means mounted to first and second base members respectively, in a housing. The heater means define an axial heating passage between them, and the base members are movable to permit opening and closing of the heater means. The assembled elongated object and unshrunk shrinkable tubing are passed through the heating passage when the heater means are in their closed position, whereby heat from the radiant heater means heats the shrinkable tubing, thereby contratcing the same over the elongated object.

---

This application is a continuation-in-part of my copending application, Ser. No. 600,441, filed Dec. 9, 1966, now abandoned, for "Heater for Contracting Shrinkable Tubing" and assigned to the same assignee.

This invention relates to apparatus for contracting shrinkable tubing over elongated objects such as electrical cables.

Insulation of electrical cables, especially those cables containing a plurality of electrical conductors, is accomplished by inserting the cable in shrinkable tubing and then heating the tubing to shrink it on the cable. Typically, the cable will be fitted with terminals, elbows, or the like, at each end. If the terminal is too large to be passed through the shrinkable tubing, the cable may be inserted in the shrinkable tubing, then fitted with large terminals, and then heat may be applied to the shrinkable tubing. Shrinkable tubing is particularly advantageous for insulating cables having pre-installed terminals small enough to be passed through the shrinkable tubing. The cable and small terminals may be readily inserted into the tubing, and the tubing may then be contracted over the cable, and perhaps part of the terminals, thereby insulating the same.

Shrinkable tubing insulation is resistant to weather and physial abuse. The relatively high tensile strength of contracted shrinkable tubing makes it particularly useful for insulating power lines and other electrical conductors which are subjected to high tension forces, such as those cables which are strung in elevated positions between power or telephone poles.

The use of shrinkable tubing for insulation of long cables has been inconvenient because there has been no simple method of heating the shrinkable tubing. Heretofore, shrinkable tubing has been contracted by applying the heat of a torch or even a soldering iron to the shrinkable tubing. While this method is satisfactory for insulating relatively short lengths of cable, it is time consuming and costly where a cable of relatively long or indefinite length is to be insulated. An object of the present invention is to provide apparatus for heating thermally shrinkable tubing over an elongated object of any desired length, whereby an elongated object may be passed through the shrinkable tubing, and the shrinkable tubing may be shrunk, continuously if desired, to sheath the elongated object for any desired length.

An optional object of this invention is to provide a readily portable unit for "spot" shrinking.

The heater according to the present invention comprises a housing supporting first and second heater means. Movable support means having first and second positions is provided for supporting the heater means and is adapted to move the heater means to an open (spaced-apart) or a closed (adjacent) position upon movement of the support means between its first and second positions. The first and second heating means define an axial heating passage between them in the closed position. When the first and second heater means are in their closed position and energized, the shrinkable tubing in the heating passage is heated, and contracts upon an assembled elongated object.

According to an optional feature of the present invention, the base members are supported by a portable housing whereby an operator may readily move the device from location to location for local treatment of the shrinkable tubing.

The above and other features of this invention will be fully understood from the following detailed description and the accompanying drawings, in which:

FIG. 1 is a perspective view of the presently preferred heater assembly according to the present invention, heating a shrinkable tubing over an elongated object;

FIG. 2 is a side elevation partly in cross-section of the heater assembly illustrated in FIG. 1;

FIG. 3 is an enlarged side elevation partly in cross-section of a portion of the heater assembly as illustrated in FIG. 2;

FIG. 4 is a cross-section taken at line 4—4 in FIG. 2;

FIG. 5 is a side elevation partly in cross-section of an elongtaed object partially sheathed by a shrinkable tubing;

FIG. 6 is a side elevation partly in cutaway cross-section of a modification of the heater assembly according to the present invention;

FIG. 7 is a perspective view of a portion of the heater assembly illustrated in FIG. 6;

FIG. 8 is a diagram of a circuit useful for controlling heaters in the heater assembly according to the present invention; and FIG. 9 is a diagram of a power reducer and delay circuit useful in the circuit of FIG. 8.

In FIGS. 1–3 there is illustrated a heater assembly 10 having a housing 12 mounted on a base 14. Housing 12 carries walls 16, 18 and 20. Housing 12 is mounted to base 14 by brackets 22 (FIG. 2).

A plurality of hook-shaped infrared radiant heaters 24–39 are mounted to base members 40 and 42 and extend above the top of housing 12. Radiant heaters 24–39 are preferably constructed from quartz and each carries an embedded heating coil 44. The base members are preferably formed of thermal insulating material, for example, a ceramic material. The radiant heaters are arranged in pairs and the heating coils of each pair of radiant heaters are connected together in series circuit. As illustrated in FIG. 4 the heating coils of each pair of radiant heaters are preferably connected in parallel by leads 46 and 48 to energizing circuit 50. The base of each radiant heater 24–31 is mounted to base member 42 so that each hook portion cooperates with a respective one of the hook portions of radiant heaters 32–39 mounted to base member 40 to form an axial heating passage 41 between them, the end of each hook portion of radiant heaters 24–31 being in close proximity to the end of the hook portion of a corresponding one of radiant heaters 32–39 when the radiant heaters are in their closed position, so as to substantially surround the heating passage.

Switch 52 is mounted to wall 16 of housing 12 and makes and breaks the power connection to circuit 50. A connection plug 54 is connected via lead 56 through wall 20 to circuit 50 for connection to a suitable source of electrical energy, for example 60 cycle 115 volt A.C. line voltage.

As illustrated in FIG. 3, surfaces 58 and 60 of base members 40 and 42 are connected to leaves 64 and 66 of hinge mechanism 62 by fastening means (not shown) so that base members 40 and 42 may rotate about shaft 68 of hinge mechanism 62.

Base members 40 and 42 are supported on their bottom surface 70 and 72, respectively, by cams 74 and 76 mounted to shaft 78 for rotation by knob 80, which knob extends from wall 16 of housing 12.

When cams 74 and 76 are in the position illustrated in the drawing, base members 40 and 42 are in a first position, and radiant heaters 24–39 are in a closed position, thereby surrounding heating passage 41 for heating shrinkable tubing. When cams 74 and 76 are rotated approximately 180° by shaft 78, base members 40 and 42 move to a second position so as to rotate radiant heaters 24–39 about shaft 68 of the hinge mechanism to their open position, illustarted by dashed lines 82 and 84 in FIG. 2. The centers of gravity of the heaters and base members are offset from the pivot point at shaft 68. When knob 80 rotates cams 74 and 76 to the open position, the support provided by cams 74 and 76 moves downwardly (as shown in the drawings), so that radiant heaters 24–39 move to their open position by their own weight, and the weight of base members 40 and 42, and the ends of the corresponding hook portions of heaters 24–39 move apart to open the heating passage at the top. The radiant heaters may be returned to the closed position by rotating knob 80 back approximately 180° so that cams 74 and 76 are rotated to the position illustrated in the drawing.

The operation of the heater mechanism will now be described in conjunction with contracting an assembled shrinkable tubing over an elongated object. An elongated object 86, which may, for example, be a cable carrying a plurality of electrical conductors, is assembled within an unshrunk shrinkable tubing 88. The passage through unshrunk shrinkable tubing 88 may be large enough to permit entry of terminals 90 which may be pre-connected to cable 86. If the terminals are too large for entry into the shrinkable tubing, they may be assembled to the cable after the shrinkable tubing is assembled to the cable, and preferably before the shrinkable tubing is contracted.

Radiant heaters 24–39 are moved to their open position by rotation of knob 80 and the assembled cable and shrinkable tubing are placed within the heating passage defined by radiant heaters 24–39. The radiant heaters are moved to their closed position by rotation of knob 80 and cams 74 and 76. Switch 52 is turned to its "on" position and knob 92, which extends from wall 16 of housing 12 and is graduated by suitable graduations, is turned to a selected position. Knob 92 provides selection of the power output from circuit 50 to coils 44 and thus selects the amount of heat radiated from radiant heaters 24–39. The heat from the radiant heaters contracts the shrinkable tubing over the elongated object, and the assembled cable and shrinkable tubing may be moved axially through the heating passage so as to heat and contract the shrinkable tubing over any desired length of the elongated object.

The movement of the cable and shrinkable tubing through the heating passage may be continuous so as to sheath a cable of any desired or indefinite length. Furthermore, should it be desired to insulate part of the terminals, the tubing can be extended over the terminals and heated in the heating passage.

To facilitate the movement of the elongated object and shrinkable tubing assembly through the heating passage, guide brackets 94 may be mounted on wall 18 of housing 12 axially aligned with the heating passage. Bracket 94 carries V-shaped guides 96 through which shrinkable tubing 88 may slide. Although only one guide bracket is illustrated, it is understood that a guide bracket may be mounted to housing 12 at each end of the heating passage.

Referring to FIGS. 6 and 7, there is illustrated a portable, hand-carried heater assembly 100 comprising a housing 102, which preferably includes a handle 103. Radiant heaters 104 and 106, each comprising a pair of quartz tubes 108, 108a and 110, 110a, respectively, contain heating coils 112, 112a and 114, 114a, respectively. When in a closed position as shown in FIG. 6, radiant heaters 104 and 106 form an axial heating passage between them.

Radiant heaters 104 and 106 are mounted to and supported by bases 116 and 118, respectively. Base 118 is fixedly attached to housing 102, and base 116 is pivotally attached to base 118 by pin or other suitable pivot means 120. Bases 116 and 118 each carry a heat sink 122, 124, respectively, for purposes to be hereinafter explained.

A slide 126 is operatively connected to slide button 128 which in turn is manually operable from the outside of housing 102. Slide 126 carries a portion 130 which cooperates with recessed portion 132 on base 116 to pivot base 116 about the axis of pivot means 120. Slide 126 preferably is constructed of a resilient material so that portion 130 is biased into recess 132. When button 128 is slid to its most forward position, toward the radiant heaters, slide 126 is moved to its most forward position, thereby moving base 116 in a counterclockwise direction about the pivot means to the position shown in FIG. 6, thereby moving radiant heater 104 to the closed position of the heaters. When button 128 is slid to its most rearward position, away from the radiant heaters, slide 126 moves to its most rearward position, thereby moving base 116 in a clockwise direction about pivot means 120 to the position shown in FIG. 7, thereby moving radiant heater 104 to the open position of the radiant heaters.

Switch 134 is physically connected to slide button 128 in order to complete an electrical circuit to the heater wires when the button is in its forward position and the heaters are in their closed position. When the button is in its rearward position and the heaters are in their open position, switch 134 prevents flow of electric current to the heater windings.

Electric cable 136 passes through grommet 138 in the rear of housing 102. Cable 136 preferably terminates with an electric plug (not shown) for connection to ordinary house current. A control circuit such as illustrated in FIG. 8 may be housed in chamber 139 and operatively connected between the switch and power cable.

In operation of the heater assembly shown in FIGS. 6 and 7, the tubing to be shrunk is inserted into the open end of the heater region when the heaters are in their open position. Button 128 is moved to its forward position, thereby closing the heaters to form a heating region substantially surrounding the tubing to be shrunk and, at the same time, energizing the heater windings. The heater assembly may then be moved axially along the length of the tubing, thereby heating and shrinking the same.

Since the heating region may reach a temperature which may cause damage to housing 102, heat sinks 122, 124 are provided so that the radiant heaters may reach sufficient operating temperatures which the housing is not adversely affected. Furthermore, the heat sinks provide a safety guard to minimize the danger that an operator's hand may slip off housing 102 and onto the radiant heaters.

Referring to FIG. 8, there is illustrated a power control circuit for controlling power to the radiant heaters of the present invention. Although this circuit is described with particular reference to the heater assembly illustrated in FIGS. 6 and 7, it is understood that this circuit is useful for controlling power to the radiant heaters of either embodiment of the present invention.

A connection plug 140 is connected via lead 142 of cable 136 to contact 144 of switch 134. Movable contact 146 of switch 134 (which may be physically connected to slide button 128) is connected via lead 148 to heater wires 114 and 114a, which are connected in parallel circuit relationship. The opposite end of heater wires 114, 114a are connected via lead 154 to power reducer and delay circuit 152. The opposite side of power reducer and delay circuit 152 is connected via lead 156 of cable 136 back to the opposite terminal of plug 140.

Heater windings 114, 114a are preferably the type having a rated voltage less than the voltage available from the power supply. One example of a suitable heater wire is a chrome-nickel wire having a rated voltage of 55 volts and a power rating of 700 watts.

Power reducer and delay circuit 152 provides full power to the heater wires during the initial operation of the heater. After a predetermined period of time, circuit 152 operates to reduce the power to the heaters to rated voltage across the parallel heater wires. When the heaters are initially cool and the circuit is initiated, the circuit delivers full power to the heater wires so as to rapidly heat them. After a sufficient time delay, preferably of the order of about 1.5 seconds, the delivered power reduces to the rated voltage of the heater wires. The heater wires are more rapidly heated by the greater-than-rated voltage, thereby reducing delays in warm-up for the heater assembly.

FIG. 9 illustrates one form of a power reducer and delay circuit 152. A pair of uni-directional diodes D1 and D2 are connected in parallel between leads 154 and 156 to conduct in one direction. Silicon-controlled rectifier SCR1 is connected in parallel with diodes D1 and D2 between leads 154 and 156, but poled to conduct in the opposite direction from diodes D1 and D2. Diode D3 is connected to lead 156 in such a manner that the anode of diode D3 is electrically connected to the anode of SCR1. Resistor R1 is connected to the cathode of diode D3 and is serially connected to capacitor C1 and the parallel combination of resistor R2 and capacitor C2. Four-layer trigger diode D4 is connected between the gate terminal of SCR1 and the junction of resistor R2 and capacitors C1 and C2. Resistor R3 is connected between lead 154 and the cathode of diode D3.

The following circuit values are given by way of example as one form of an operative power reducer and delay circuit 151:

Rectifiers: Type
D1, D2 _____ IN4999
D3 _____ IN4003
D4 _____ ¹TI-42
SCR1 _____ 2N4154

Resistors:
R1 _____ohms__ 4.7K
R2 _____do____ 39K
R3 _____megohms__ 4.7

Capacitors: Microfarads
C1 _____ 2 (electrolytic)
C2 _____ 0.047

¹ From Texas Instruments, Inc.

In the operation of the power reducer and delay circuit, the first positive half-cycle on lead 156 causes current to flow through diode D3 to charge electrolytic capacitors C1 and C2. Due to the voltage divider action between capacitors C1 and C2, the charge on capacitor C1 will be quite small compared to the charge on capacitor C2. When capacitor C2 has charged to about 30 volts greater than the charge on capacitor C1, four-layer diode D4 is triggered on. Capacitor C2 discharges through diode D4 to the gate of SCR1. During the remaining portion of the positive half-cycle, SCR1 permits current to flow from lead 156 to lead 154. Since the half-cycle has a peak of about 130 volts, a substantial portion of the half-cycle is passed by SCR1. During each negative half-cycle, diodes D1 and D2 conduct in the opposite direction. During the second positive half-cycle, an additional charge is impressed on capacitors C1 and C2, and capacitor C2 will charge to a level greater than the charge on capacitor C1 which is sufficient to again trigger diode D4. Diode D4 again conducts, allowing discharge of current from capacitor C2 to the gate of SCR1.

Each time SCR1 conducts, the SCR effectively shunts the capacitor network, thereby preventing further charging of capacitors C1 and C2. Diode D3 prevents discharge of the capacitors at this time. During the initial portion of each positive half-cycle on line 156, capacitor C1 charges to a higher level than before until the difference between the charges on capacitors C1 and C2 becomes too small to trigger diode D4. The diode D4 is then prevented from further triggering to its "on" condition, and SCR1 is then biased continuously to its "off" condition. At this time, current is permitted to flow through diodes D1 and D2 from lead 154 to lead 156. During each positive half-cycle on line 156, diode D3 maintains the charge on capacitor C1 so as to further prevent the firing of SCR1.

When the circuit is turned off, capacitors C1 and C2 are permitted to discharge through the resistors R3 and R2. The time delay provided by the capacitors may be accurately controlled by providing a proper resistor R1 and proper relative sizing of capacitors C1 and C2. The circuit thus provides a time delay before biasing off SCR1, which time delay is preferably of the order of about 1.5 seconds.

FIGS. 1 and 5 illustrate an elongated object 86 having terminals 90 on each end and being sheathed by shrinkable tubing 88. As illustrated in FIG. 5, shrinkable tubing 88 may have a length proportionate to the elongated object 86 so as to abut terminals 90. Alternatively, the shrinkable tubing may extend over the terminals so as to insulate them when the tubing is contracted. The right-hand portion of FIG. 5 illustrates the shrinkable tubing contracted over elongated object 86, while the left-hand side of the drawing illustrates an unshrunk portion 98 of the shrinkable tubing. The portion of the shrinkable tubing between the unshrunk and contracted portions is within the heating passage and is being contracted. The assembled shrinkable tubing and elongated object are moved axially through the heating passage, preferably guided by guides 96. As the assembled shrinkable tubing and elongated object move through the heating passage, radiant heaters 24–39 heat the shrinkable tubing, thereby contracting the same on the elongated object. The movement through the heating region may be continuous so as to insulate a cable or elongated object for any desired or indefinite length.

The right-hand side of FIG. 5 illustrates the final product comprising elongated object 86 insulated by contracted shrinkable tubing 88 for any desired or indefinite length.

The present invention thus provides apparatus for contracting shrinkable tubing over an elongated object of indefinite length which is simple to use and effective over any length.

This invention is not to be limited by the embodiment shown in the drawings and described in the description, which is given by way of example and not of limitation, but only in accordance with the scope of the appended claims.

What is claimed:

1. Apparatus for shrinking thermally shrinkable tubing over an elongated object, said apparatus comprising a housing; first and second heater means supported by said housing, said first and second means being movable relative to each other to respective open and close positions, the first and second heater means defining between them an axial heating passage when in their closed positions; a shaft supported within said housing; first and second cam means mounted to said shaft and supporting said first and second heater means, respectively, at a first point on each of the respective first and second heater means; hinge means supported by said housing for supporting said first and second heater means at a second point on each of the respective first and second heater means, said shaft being movable to respective first and second positions to move the relative positions of said first and second heater means to the respective open and closed positions, said first and second heater means adapted to be moved to their open position to open the heating passage and receive a shrinkable tubing and elongated object and further adapted to be moved to their closed position to close the heating passage and surround a portion of the shrinkable tubing and elongated object, whereby the shrinkable tubing may be moved axially through the heating passage and said first and second heater means heat the portion of said thermally shrinkable tubing in said heating passage, thereby causing that portion of said shrinkable tubing to contract onto said elongated object.

2. Apparatus according to claim 1 further including guide means supported by said housing adapted to guide the shrinkable tubing and elongated object axially through the heating passage.

3. Apparatus according to claim 1 wherein said first and second heater means comprise respective first and second pluralities of infrared radiators, first and second base members, each of said first and second pluralities of infrared radiators being mounted axially to a respective one of said first and second base members, each of said first plurality of infrared radiators cooperating with corresponding ones of said second plurality of infrared radiators to define said axial heating passage.

4. Apparatus according to claim 3 wherein each of said infrared radiators comprises an electrical heater element.

5. Apparatus according to claim 4 wherein said first and second plurality of infrared radiators are each disposed in pairs, means connecting one of the electrical heater elements of each of said pairs in series to the other electrical heater element of that pair, and means connecting the pairs of serially-connected electrical heater elements in parallel.

6. Apparatus according to claim 3 wherein each infrared radiator is a hook-shaped member having a base mounted to one of said first and second base members and said shaft is operable to move said base members, whereby when said shaft is in its first position the end of the hook portion of each of said plurality of infrared radiators is in close proximity with the end of the hook portion of a corresponding one of said second plurality of infrared radiators to substantially close said axial heating passage between said hook-shaped members, and when said shaft is in its second position the end of the hook portion of each of said first plurality of infrared radiators is spaced apart from the end of the hook portion of the corresponding one of said second plurality of infrared radiators, thereby opening the heating passage.

7. Apparatus for shrinking thermally shrinkable tubing over an elongated object, said apparatus comprising a housing: first and second electric heater means supported by said housing, said first and second electric heater means being movable relative to each other to respective open and closed positions, the first and second heater means defining between them an axial heating passage when in their closed position; movable support means supported wiithin said housing and supporting at least one of said heater means, said movable support means being movable to respective first and second positions to move the relative positions of said first and second heater means to the respective open and closed positions; and a control circuit connected to the said heater means including a switch, reducing means for reducing electric power to said heater means and delay means for delaying operation of said reducing means upon initiation of said control circuit to permit flow of full power to said heater means for a period of time, said first and second heater means being adapted to be moved to the open position to open the heating passage and receive a shrinkable tubing and elongated object and further adapted to be moved to their closed position to close the heating passage and surround a portion of the shrinkable tubing and elongated object, whereby the shrinkable tubing may be moved axially through the heating passage and said first and second heater means heat the portion of said thermally shrinkable tubing in the said heating passage, thereby causing that portion of said shrinkable tubing to contract onto said elongated object and whereby upon initiation of said control circuit full power is delivered to said electric heater means, said delay means reducing the power to said electric means after a time delay determined by said delay means.

8. Apparatus according to claim 7 wherein said movable support means comprises bias means slidably mounted in said housing, said bias means supporting at least one of said heater means and adapted to move said heater means between aid respective open and closed positions.

9. Apparatus according to claim 8 further including means coupling said switch to said bias means whereby said switch permits the flow of power to said heater means when said bias means biases said heater means to the said closed position and said switch means prevents the flow of power to said heater means when said bias means biases said heater means to the said open position.

10. Apparatus according to claim 7 wherein said reducing means comprises first uni-directional conducting means, and second uni-directional conducting means having a gate and being capable of being switched between one said state in which current may be passed in one direction and a non-conducting state in which current is not passed, said second uni-directional conducting means being connected in parallel to and oppositely poled from said first uni-directional conducting means, and said delay means being connected to said gate whereby said first and second uni-directional conducting means are capable of passing current upon initial operation of said control circuit, and said delay means switches said second uni-directional conducting means to its non-conducting state after said time delay.

11. Apparatus according to claim 7 wherein said housing has a handle to permit use as a hand tool.

References Cited
UNITED STATES PATENTS

| | | | |
|---|---|---|---|
| 3,356,784 | 12/1967 | Bertioli et al. | 219—501 |
| 3,284,613 | 11/1966 | Gettelman et al. | 219—535 |
| 3,152,239 | 10/1964 | Faulconer | 219—240 |
| 3,141,089 | 7/1964 | Hultgreen | 219—553 |
| 3,139,299 | 6/1964 | Bowen | 294—115 |
| 2,992,314 | 7/1961 | Drugmand et al. | 219—535 |
| 1,978,220 | 10/1934 | Otte | 219—155 |

BERNARD A. GILHEANY, Primary Examiner

D. M. MORGAN, Assistant Examiner

U.S. Cl. X.R.

219—492, 535

UNITED STATES PATENT OFFICE
CERTIFICATE OF CORRECTION

Patent No. 3,475,592                                             October 28, 196

Josef U. Berkl

It is certified that error appears in the above identified patent and that said Letters Patent are hereby corrected as shown below:

Column 1, line 29, "contratcing" should read -- contracting --; line 57, "physial" should read -- physical --. Column 2, line 39, "elongtaed" should read -- elongated --. Column 3, lin 28, "illustarted" should be -- illustrated --. Column 4, line 69, "which" should read -- while --. Column 5, line 51, after "circuit", "151:" should read -- 152: --. Column 7, line 67, "wiithin" should read -- within --. Column 8, line 28, "aid" should read -- said --.

Signed and sealed this 19th day of May 1970.

(SEAL)
Attest:

Edward M. Fletcher, Jr.
Attesting Officer

WILLIAM E. SCHUYLER, JR.
Commissioner of Patents